United States Patent

Oishi et al.

[15] 3,688,306

[45] Aug. 29, 1972

[54] DIGITAL TYPE ROTATIONAL ANGLE DETECTOR

[72] Inventors: Kazuo Oishi; Noriyoshi Ando; Hiroshi Yoshida, all of Kariya, Japan

[73] Assignee: Nippondenso Co., Ltd., Kariya-shi, Japan

[22] Filed: March 17, 1971

[21] Appl. No.: 125,286

[30] Foreign Application Priority Data

March 18, 1970 Japan ......................45/23254
March 18, 1970 Japan ......................45/23255

[52] U.S. Cl. ..................340/347 P, 310/68, 310/168
[51] Int. Cl. ..............................................G08c 5/00
[58] Field of Search........................310/68, 168–170, 310/112–114; 340/347 P

[56] References Cited

UNITED STATES PATENTS

| | | | |
|---|---|---|---|
| 3,319,094 | 5/1967 | Snodgrass | 310/68 |
| 3,509,395 | 4/1970 | Schrecongost | 310/168 |
| 3,123,818 | 3/1964 | Steele | 340/347 P |
| 3,510,699 | 5/1970 | Frederickson | 310/114 |
| 3,196,426 | 7/1965 | Kirkness | 340/347 P |

*Primary Examiner*—J. D. Miller
*Assistant Examiner*—R. S. Skudy
*Attorney*—Cushman, Darby & Cushman

[57] ABSTRACT

A digital type rotational angle detecting device has been provided, for determining the rotational angle of a rotating axis. The apparatus includes a rotor mounted on an axis having a plurality of, permanent magnet, salient poles formed about the outer periphery thereof, and stator means having a plurality of salient poles, formed on the inner periphery thereof, and disposed about the outer periphery of the rotor means, with a selected gap maintained therebetween. Coils are provided for each staor pole and would on the stator means, for generating output voltage signals due to variations in magnetic fluxes,induced in the stator poles when the axis is rotated. Each set of rotor and stator poles includes, a respective standard pole for generating a reference output voltage in the coils when the standard rotor pole is in alignment with the standard stator pole, such position representing a pre-determined reference angle of the rotating axis relative to said standard rotor pole. Circuit means is coupled with each of the coils for counting a selected number of output voltage signals generated in the coils relative to said reference output voltage, whereby a rotational angle of the axis is taken in accordance with a selected number of counts of said counting means.

5 Claims, 6 Drawing Figures

INVENTORS
OISHI et al

BY Cushman, Darby & Cushman
ATTORNEYS

INVENTORS
Oishi et al

BY Cushman, Darby & Cushman
ATTORNEYS

DIGITAL TYPE ROTATIONAL ANGLE DETECTOR

BACKGROUND OF THE INVENTION

1. Field of the Invention

This invention relates to a digital type rotational angle detector which detects a rotational angle of an internal combustion engine, etc., as a digital quantity.

2. Description of the Prior Art

Conventionally, the rotational angle of the crank shaft of an engine is detected by a cam provided on the crank shaft so as to open and close a pair of contacts In such a conventional device, however, detection of the rotational angle of a crank shaft is possible only where the cam is designed to close the contacts.

An object of this invention is to provide a digital type rotational angle detecting device comprising:

a rotor having a plurality of salient poles formed on the outer periphery and mounted on a rotational axis;

a plurality of stator poles including one standard pole disposed around the outer periphery of said rotor with a predetermined gap in such a manner that one rotor pole faces one stator pole, and at least one other rotor pole does not face any stator pole, so as to form magnetic fluxes between said rotor poles and said stator poles; and coils for detecting variations in the magnetic fluxes as variations in the induced electric potential.

Another object of this invention is to provide a digital type rotational angle detecting device comprising a rotor mounted on a rotatable axis and having a plurality of salient poles on the outer periphery, one of said poles working as a standard, a plurality of stator poles including one standard pole disposed around the rotor with a certain gap therebetween, magnetic flux being formed between said rotor pole and said stator pole, and windings for detecting the variation of said magnetic flux as a variation in the electrical potential.

According to the present invention, a predetermined reference rotational angle can be detected by a larger digital signal generated from the coil when the standard rotor pole faces against the standard stator pole. Further, by utilizing said larger digital signal as a standard, an arbitrary rotational angle can be detected by counting the number of smaller digital signals from said coil. Here, since the relative positions of said rotor poles and said stator poles are arranged in such a manner that when one rotor pole faces one stator pole, at least one other rotor pole does not face any stator pole, reduction in the number of poles can be achieved by providing a certain number of digital signals per one rotation, compared with the case when every rotor pole faces a stator pole simultaneously. Further, said detector may be composed only of one rotor having a plurality of salient poles, the same number of stator poles as that of said rotor poles, and a winding. Thus, the overall structure can be made very compact and be easily assembled in the distributor of an engine.

A further object of this invention is to provide a digital type rotational angle detecting device comprising a first rotor having a plurality of salient poles on the outer periphery, a second rotor having one salient pole on the outer periphery, both rotors being mounted on a rotatable axis, the salient pole of said second rotor and one of the salient poles of said first rotor forming a pair, a plurality of stator salient poles disposed around said first rotor with a certain gap therebetween, a second stator salient pole disposed outside the outer periphery of said second rotor at a certain distance, said second stator pole and one of said first stator poles forming a pair, magnetic fluxes being formed between the first rotor and stator poles and between the second rotor and stator poles, and a coil for detecting the variation of said magnetic flux as a variation in electric potential.

According to this invention, a predetermined rotational angle of the rotor can be detected by a digital signal of large wave height generated from said coil when the pole of said second rotor faces said second stator pole, and by utilizing said particular digital signal as a standard an arbitrary rotational angle can be detected by counting the number of digital signals of relatively small wave height generated from said coil. Further, since the digital signal generated at said predetermined rotational angle has a larger wave height than that of the digital signals generated at other rotational angles, detection of said predetermined rotational angle can be very accurately and easily done simply by discriminating between said two kinds of signals. Further, since the relative positions of said first rotor poles and said first stator poles are arranged in such a manner that when one rotor pole faces one stator pole, at least one other rotor pole does not face any stator pole, and a reduction in the number of poles can be achieved for providing a certain number of digital signals per one rotation compared with the case when every rotor pole faces a stator pole at the same instant.

DESCRIPTION OF THE PREFERRED EMBODIMENTS

Figure 1:
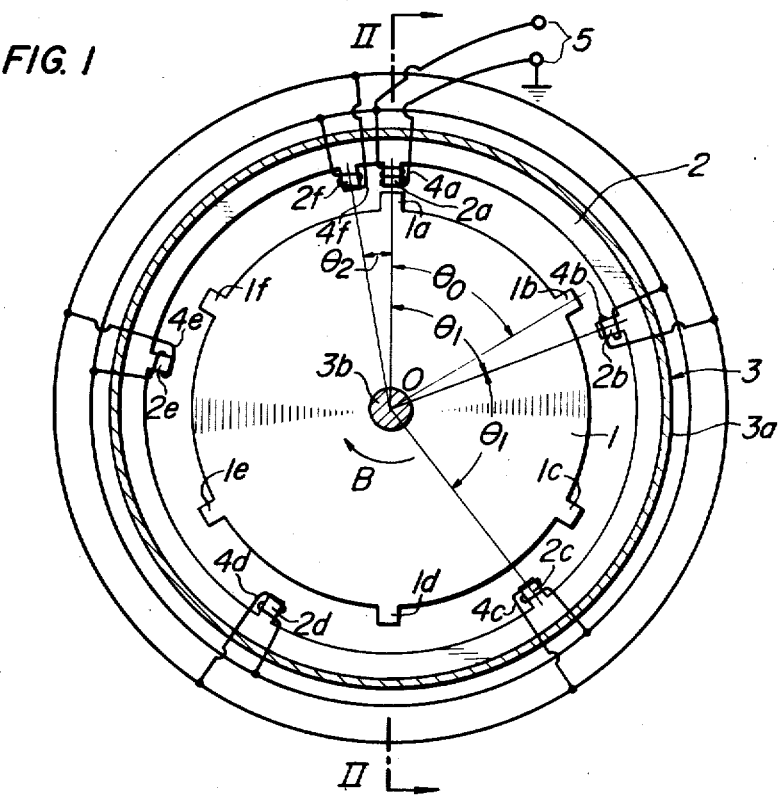
FIG. 1 is a partially cross-sectional plan view of one embodiment of a digital type rotational angle detecting device according to this invention.
Figure 2:
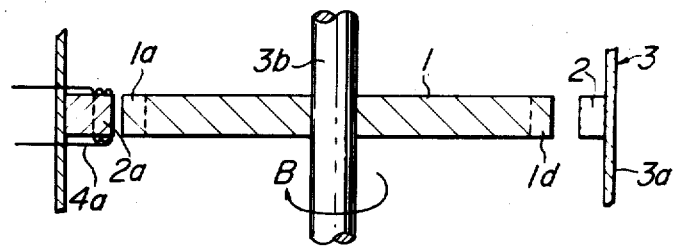
FIG. 2 is a longitudinal cross-sectional view along line II–II of FIG. 1, but with a portion of the coil being eliminated.
Figure 3:
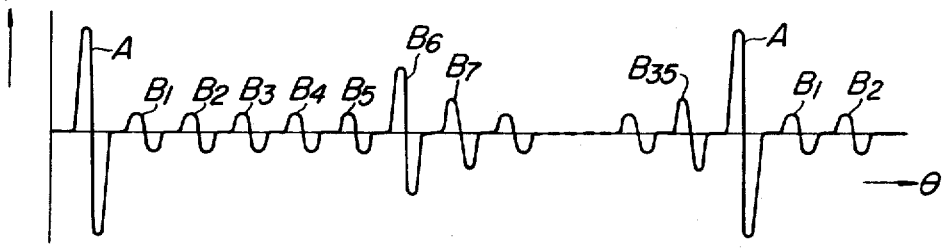
FIG. 3 shows an output voltage characteristic curve of the present device shown in FIGS. 1 and 2.

The first embodiment of a device of detecting a rotational angle in an engine according to this invention will first be described in connection with FIGS. 1, 2 and 3. In FIGS. 1 and 2, a rotor 1 consists of a permanent magnet and has six salient poles $1a$, $1b$, $1c$, $1d$, $1e$ and $1f$ formed on its circumference. Here, one pole $1a$ is formed to have a larger width than that of the other poles so as to work as a standard pole. An annular stator 2 is formed of a magnetic material and has six salient poles $2a$, $2b$, $2c$, $2d$, $2e$ and $2f$ formed on the inner periphery with one pole $2a$ serving as a standard pole. A distributor 3 is disposed in an engine (not shown). Reference $3a$ designates the housing of the distributor and $3b$ a rotating shaft which rotates in synchronism with the engine. Said rotor 1 is mounted on this rotating shaft $3b$ and said stator 2 is fixed on the inner surface of said housing $3a$ with a certain gap maintained between the circumference of the rotor 1.

Letting the angles $1a$–$0$–$1b$, $1b$–$0$–$1c$, $1c$–$0$–$1d$, $1d$–$0$–$1e$, $1e$–$0$–$1f$ and $1f$–$0$–$1a$ be $\theta_0$, $$\theta_0 = 360°/m \quad (1),$$

where, $m$ is the number of salient poles on the rotor. Letting the angles $2a$–$0$–$2b$, $2b$–$0$–$2c$, $2c$–$0$–$2d$, $2d$–$0$–$2e$, and $2e$–$0$–$2f$ be $\theta_1$, $$\theta_1 = 360°/(m\cdot n) + (360°/m\cdot n)/(m\cdot n) \quad (2),$$

where, $n$ is an arbitrary integer ($m\cdot n$ indicating the number of salient poles on the stator). Letting the angle $2f$–$0$–$2a$ be $\theta_2$, $\theta_2$ inevitably becomes $$\theta_2 = (360°/m\cdot n)/(m\cdot n) \quad (3).$$

The embodiment shown in FIG. 1 is the case of $m = 6$ lower $n = 1$, therefore $$\theta_0 = 360°/6 = 60°,$$

$$\theta_1 = 360°/(6 \times 1) + (360°/6 \times 1)/(6 \times 1) = 70° \text{ and}$$

$$\theta_2 = (360°/6 \times 1)/(6 \times 1) = 10°.$$

By such an arrangement, when one rotor pole, for example $1a$, as is shown in FIG. 1, faces a stator pole $2a$, none OF THE OTHER ROTOR POLES FACES ANY STATOR POLE. Coils $4a$, $4b$, $4c$, $4d$, $4e$, and $4f$ are wound on the stator poles $2a$, $2b$, $2c$, $2d$, $2e$, and $2f$, respectively and are connected in parallel to output terminals 5. Here, the number of turns of the coil $4a$ wound on the standard stator pole $2a$ is made larger than those of other coils.

Now, the operation of the above-described device will be described referring to FIG. 3. In FIG. 3, the abscissa represents the rotational angle $\theta$ of an engine and the ordinate represents the output voltage V across the terminals 5. When the rotating shaft $3b$ of the distributor 3 rotates in synchronism with the rotation of the engine, the rotor 1 also rotates therewith. As the standard rotor pole $1a$ approaches, faces and moves away from the standard stator pole $2a$, the magnetic flux between the poles $1a$ and $2a$ is subjected to a variation, generating an output signal across the terminals 5. Further, since the pole $1a$ is wider than the other poles, the magnetic flux crossing the coil $4a$ wound on said pole $2a$ is made greater than the others. And since said coil $4a$ has a larger number of turns than the other coils, the electric potential induced in the coil $4a$ has a much larger wave height as shown at A FIG. 3. This output voltage A is utilized as the (synchronous) standard signal representing a predetermined rotational angle. Then, as the rotor 1 rotates from the state shown in FIG. 1 in the direction shown by an arrow B and the rotational angle becomes large, the rotor poles $1b$, $1c$, $1d$, $1e$, $1f$ and $1a$ successively approach and moves away from the stator poles $2b$, $2c$, $2d$, $2e$, $2f$ and $2a$, respectively. The variations in magnetic flux between the poles are detected by the coils $4b$, $4c$, $4d$, $4e$, $4f$ and $4a$ as variations in electric potential and generates output voltages $B_1$, $B_2$, $B_3$, ... $B_{35}$ at the output terminals 5. Here, the wave heights of these output signals $B_1$, $B_2$, $B_3$ ..., $B_{35}$ are smaller than that of said standard signal A, the output voltage $B_6$ is induced in the coil $4a$ wound on the stator pole $2a$ when the rotor pole $1f$ approaches, faces and moves away from the stator pole $2a$, and the output voltage $B_7$ is induced in the coil $4b$ when the rotor pole $1a$ approaches, faces and moves away from the stator pole $2b$. In short, when the rotor 1 is rotated, four kinds of pulse signals A, $B_1$, $B_6$, $B_7$ shown in FIG. 3 are generated and 36 pulse signals are generated per one rotation of the rotor 1. This number of pulses is given by (the number of poles on the rotor 1 : 6) × (the number of poles on the stator 2 : 6). Thus, the predetermined standard rotational angle of an engine can be detected by detecting an output voltage A, and an arbitrary rotational angle can be detected by utilizing said output voltage A as a standard and then counting the output voltages $B_1$, $B_2$, $B_3$ ... by, for example, a counter circuit. Further, a particular rotational angle can also be detected by detecting the output voltage $B_6$ or $B_7$.

The present invention should not be limited to the first embodiment described above, but may also include the following modifications.

a. It is only required for the relative disposition of the poles of the rotor 1 and the stator 2 that when one rotor pole faces one stator pole, at least one other rotor pole does not face any stator pole. Thus, such pole arrangements can be adopted as one in which two rotor poles face respective stator poles at a time.

b. The rotor 1 may consist of a magnetic material and the stator 2 may consist of a permanent magnet. Further, the rotor 1 may consist of a magnetic material loaded with permanent magnets. In short, any structure can be taken only if a magnetic flux can be passed between a rotor pole and a stator pole. The stator 2 may not be of an annular shape, but separate poles can be independently disposed around the rotor 1.

c. The subject, the rotational angle of which is to be detected, may not be an engine, but may be any rotating machine. In the case of detecting the rotational angle of an engine as in the above embodiment, the present device can be effectively built in the space of a distributor and thus is advantageous in the economic use of space.

d. In order to induce an output voltage of a larger wave height than others in the coil $4a$ when the standard rotor pole $1a$ faces the standard stator pole $2a$, the thickness and the length of the pole $1a$ may be increased together with an increase in the turns of the coil $4a$, as well as widening the width of the pole $1a$ with the turns of the coil $4a$ being increased as is described in the above embodiment.

Figure 4:
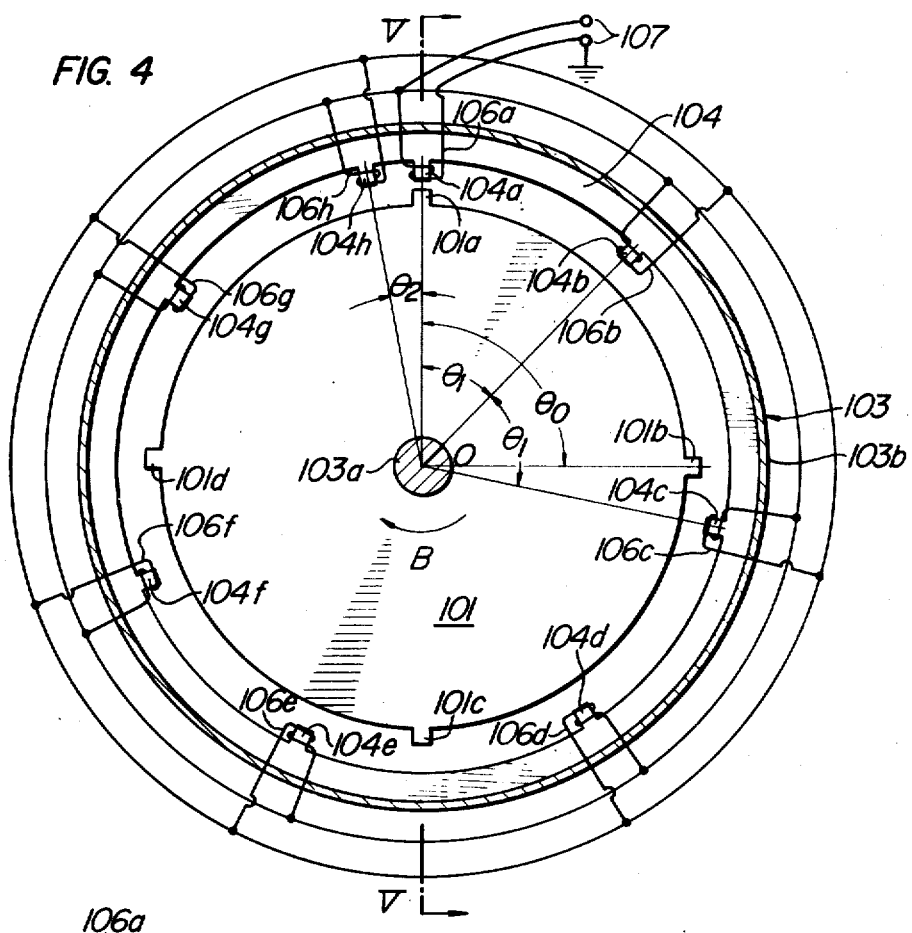
FIG. 4 is a partially cross-sectional plan view of another embodiment of a digital type rotational angle detecting device according to this invention.
Figure 5:
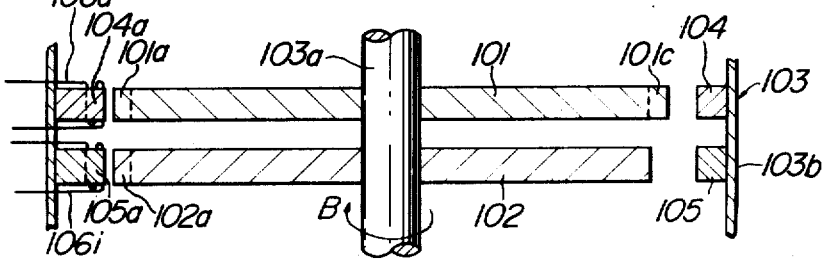
FIG. 5 is a longitudinal cross-section along line V—V of FIG. 4.
Figure 6:
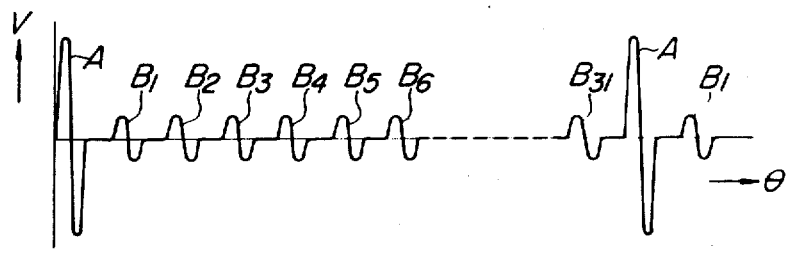
FIG. 6 shows an output voltage characteristic curve of the device of FIGS. 4 and 5.

Now, the second embodiment of a rotational angle detecting device according to this invention will be described, referring to FIGS. 4, 5 and 6. In FIGS. 4 and 5, a first rotor 101 consists of a permanent magnet and has four poles $101a$, $101b$, $101c$ and $101d$ on the periphery. A second rotor 102 also consists of a permanent magnet and has one pole $102a$ on the periphery. Both the first and the second rotors 101 and 102 are attached in superposition to the rotatable shaft $103a$ of a distributor 103, with the pole $101a$ of the first rotor and the pole $102a$ of the second rotor being superposed vertically in FIG. 5 to form a pair. A first annular stator 104 consists of magnetic material and has eight poles $104a$, $104b$, $104c$, $104d$, $104e$, $104f$, $104g$, $104h$ on the inner periphery. The first stator is fixed to the inner surface of the housing $103b$ of the distributor 103 with a certain gap kept between the outer periphery of said rotor 101. A second annular stator 105 consists of a magnetic material and has one stator pole $105a$ on the inner periphery. This second stator is fixed to the inner surface of the housing $103b$ of the distributor 103 with a certain gap maintained against the outer periphery of said second rotor 102, with said second stator pole 105a vertically aligned in FIG. 5 with said first stator pole 104a.

Letting the angles 101a–0–101b, 101b–0–101c, 101c–0101d, and 101d–0–101a be $\theta_0$, the angles 104a–0104b, 104b–0–104c, 104c–0–104d, 104d–0–104e, 104e–0–104f, 104f–0–104g and 104g–0–104h be $\theta_1$, and the angle 104h–0–104a be $\theta_2$, $\theta_1$, $\theta_2$ and $\theta_3$ are determined according to equations (1), (2) and (3). The embodiment shown in FIG. 4 is the case of $m = 4$ and $n = 2$, therefore $$\theta_0 = 90°$$

$$\theta_1 = 50.625°$$

$$\theta_2 = 5.625°$$

By the above angular setting, when one first rotor pole, e.g., 101a, faces a first stator pole, e.g., 104a, as is shown in FIG. 4, any of the other first rotor pole does not face any stator pole. θ the circumferential surfaces of the first stator poles 104a, 104b, 104c, 104d, 104e, 104f, 104g, 104h and the second stator pole 105a, are wound coils 106a, 106b, 106c, 106d, 106e, 106f, 106g, 106h, and 106i, respectively, which are connected in parallel to output terminals 107.

Then, the operation of the above embodiment will be described referring to the output voltage waveform of FIG. 6. In FIG. 6, the abscissa represents the rotation angle θ of the engine and the ordinate represents the output voltage V generated at the output terminals 107. As the first and second rotors 101 and 102 are rotated with the rotation of the distributor shaft 103a in synchronism with the rotation of the engine, and when the first rotor pole 101a approaches, faces, and moves away from the first stator pole 104a, the second rotor pole 102a aligned with the first rotor pole 101a also approaches, faces, and moves away from the second stator pole 105a simultaneously. At this instance, variations in the magnetic fluxes between the poles 101a – 104a, and 102a – 105a are detected by the coils 106a and 106i as variations in the induced electric potential which are superposed and appear at the output terminals 107, as shown at A of FIG. 6. This output signal A of a larger wave height is assigned as the standard signal representing a predetermined rotational angle. Then, as the first and second rotors 101 and 102 are rotated in the direction indicated by arrow B from the state of FIG. 4 to increase the rotational angle θ, the first rotor poles 101b, 101c, 101d and 101a successively approach, face and part from the first stator poles 104c, 104e, 104g, 104b, 104d, 104f, and 104h. Variations in the magnetic fluxes between poles at these moments are detected by the coils 106b, 106c, 106d, 106e, 106f, 106g, 106h and 106a in the form of variations of the induced electric potential to provide output voltages across the output terminals 107, as shown at $B_1$, $B_2$, $B_3$, . . . ., $B_{31}$ in FIG 6. Here, these output voltages $B_1$, $B_2$, $B_3$, . . . ., $B_{31}$ have smaller wave heights than that of the standard output voltage A. Thus, in one rotation of the rotors 101 and 102, thirty two pulse signals comprising the output voltage A and the output voltages $B_1$, $B_2$, . . . ., $B_{31}$ are generated. The number of these pulses is given by (the number of the first rotor poles ; 4) × (the number of the first stator poles ; 8). Thus, the detection of the output voltage A indicates a predetermined standard rotational angle of the engine and the count of the output voltages $B_1$, $B_2$, $B_3$, . . . . with reference to the standard output voltage A by means of, for example, a counting circuit, can detect an arbitrary rotational angle.

Further, the present invention is not limited to the above embodiment, but includes the following modifications.

a. It is only required for the relative disposition of the poles of the first rotor and stator 101 and 104 that when one rotor pole faces one stator pole, at least one other rotor pole does not face any stator pole. Thus, such pole arrangements can be adopted as one in which two rotor poles face respective stator poles at a time.

b. First and second rotors consisting of magnetic material and the first and second stator poles consisting of permanent magnets may be adopted. Further, the first and second rotors may be formed of magnetic material and have permanent magnets attached. In short, any structure can be adopted only if magnetic fluxes can be passed between the first and second rotor poles and the first and second stator poles. Yet further, the first and second stators are not limited to be annular, but separate poles may be independently installed around the circumference of the first and second rotors.

c. The subject, the rotational angle of which is to be detected, may not be an engine, but may be any rotating machine. In the case of detecting the rotational angle of an internal combustion engine as in the above embodiment, the present device can effectively be built in the space of a distributor and thus is advantageous from the viewpoint of economy of space.

We claim:

1. A digital type rotational angle detecting device for detecting a rotational angle of a rotating axis comprising:

rotor means mounted on said rotating means, having a plurality of permanent magnet salient poles formed about the outer periphery thereof, stator means having a plurality of salient poles formed on the inner periphery thereof, disposed about the outer periphery of said rotor means with a selected gap maintained therebetween, a coil for each stator pole, wound on said stator means for generating output voltage signals due to variations in magnetic fluxes induced in said stator poles when said rotating axis is rotated, said plurality of rotor and stator poles, each including, a respective standard pole for generating a reference output voltage in said coils when said standard rotor and stator poles are in alignment, said standard stator poles positioned so as to represent a predetermined reference angle relative to said standard rotor pole of said rotating axis, and circuit means coupled with said coils for counting a selected number of output voltage signals generated in said coils relative to said reference output voltage; whereby the rotational angle of said axis is taken in accordance with a selected number of counts of said counting means.

2. A digital type rotational angle detecting device according to claim 1, wherein said rotor means comprises:
a first rotor having a plurality of permanent magnet salient poles, and a second rotor, mounted coaxially with the first rotor having a permanent magnet salient pole, and said stator means comprises:
a first stator having a plurality of salient poles and their associated coils, disposed about the outer periphery of said first rotor, and a second stator having a salient pole and its associated coil disposed about the outer periphery of said second rotor, and wherein the respective poles of the second rotor and stator constitute said standard poles.

3. A digital type rotational angle detecting device according to claim 1, wherein the standard poles of said rotor means has a width greater than that of the other poles thereof, and said standard poles of said stator means is provided with an associated coil having a number of turns greater than that of the other poles thereof.

4. A digital type rotational angle detecting device according to claim 1, in which, said plurality of rotor poles are disposed at equal angular spacing about the rotating axis, and said plurality of stator poles are disposed at selected angular spacing different from said rotor angular spacing about said rotating axis.

5. A digital type rotational angle detecting device according to claim 1, wherein said respective poles of the rotor and stator are disposed about the rotational axis such that, only one rotor pole may be aligned with any stator pole at a given instant of rotation, so that each output voltage signal and reference voltage signal occurs at selected periodic intervals.

* * * * *